(12) United States Patent
Frey et al.

(10) Patent No.: US 7,905,787 B2
(45) Date of Patent: Mar. 15, 2011

(54) DRIVE SYSTEM FOR A MOTOR VEHICLE

(75) Inventors: Peter Frey, Gerolzhofen (DE); Michael Kühner, Schwanfeld (DE); Alexander Markow, Schweinfurt (DE); Michael Heuler, Würzburg (DE); Martin Grumbach, Heimenkirch (DE); Bernhard Sich, Friedrichshafen (DE); Robert Reiser, Nenzingen (DE); Peter Hammer, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 528 days.

(21) Appl. No.: 12/009,973

(22) Filed: Jan. 23, 2008

(65) Prior Publication Data

US 2008/0179155 A1 Jul. 31, 2008

(30) Foreign Application Priority Data

Jan. 27, 2007 (DE) .......................... 10 2007 004 203

(51) Int. Cl.
*F16D 3/52* (2006.01)

(52) U.S. Cl. .......................................... 464/98; 192/3.29
(58) Field of Classification Search .................... 464/98, 464/99; 192/3.29
See application file for complete search history.

(56) References Cited

U.S. PATENT DOCUMENTS

| | | | |
|---|---|---|---|
| 6,280,334 B1 * | 8/2001 | Tsuchiya et al. | 464/98 |
| 6,298,965 B1 * | 10/2001 | Krause et al. | 192/3.29 |
| 6,364,777 B1 | 4/2002 | Kundermann | |
| 7,011,196 B2 * | 3/2006 | Sudau | 192/3.29 |

* cited by examiner

*Primary Examiner* — Greg Binda
(74) *Attorney, Agent, or Firm* — Cohen Pontani Lieberman & Pavane LLP

(57) ABSTRACT

A drive system for a motor vehicle comprises a drive unit with a drive shaft and a torque-transmitting assembly, which is to be connected on the drive side to the drive shaft for rotation in common around an axis of rotation (A) and which is to be connected on the takeoff side to a gearbox. The drive-side connection is accomplished by means of an axial plug-in connection arrangement, and the torque-transmitting assembly is supported in at least one axial direction on the gearbox.

12 Claims, 3 Drawing Sheets

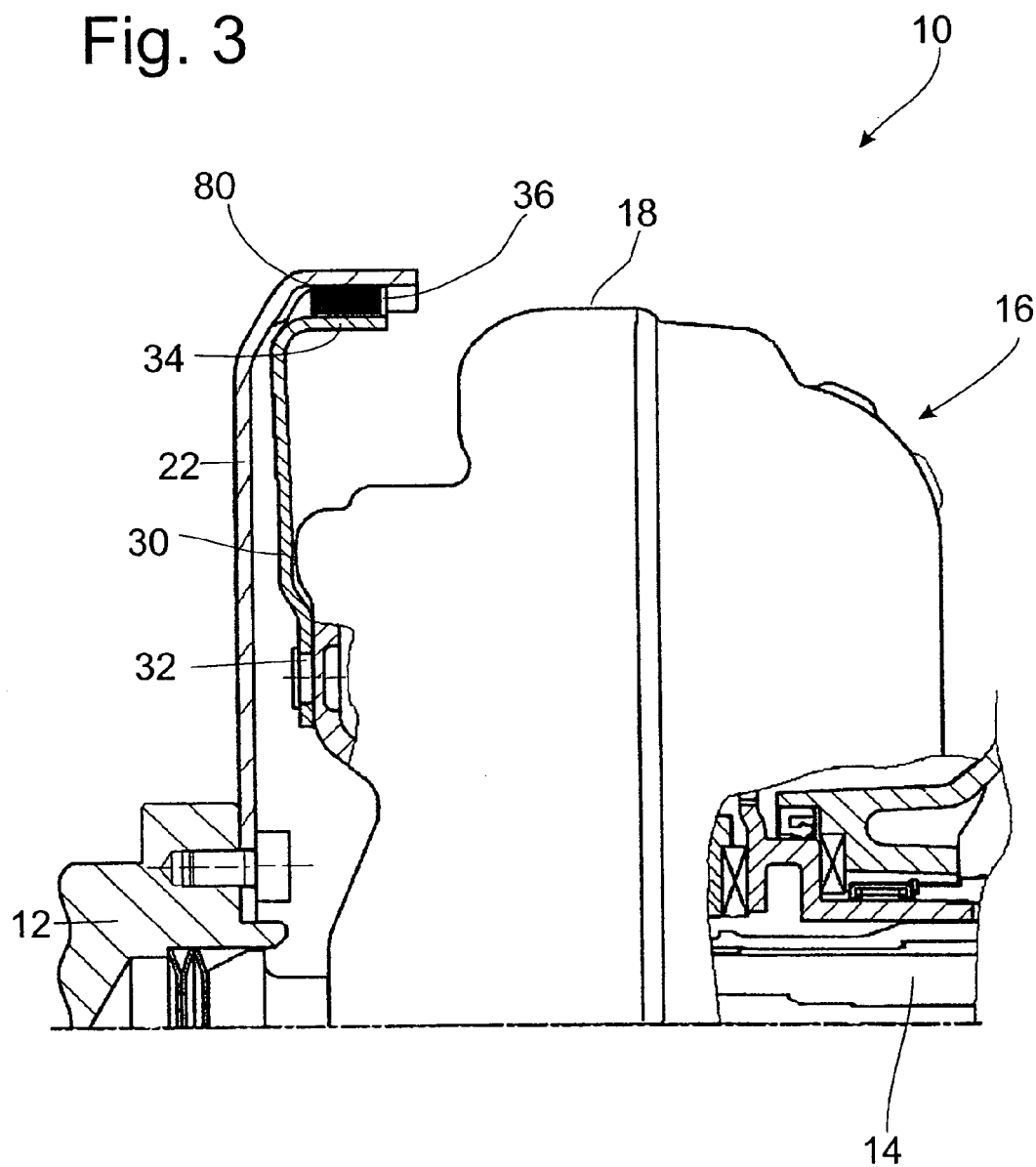

DRIVE SYSTEM FOR A MOTOR VEHICLE

BACKGROUND OF THE INVENTION

1. Field of the Invention

The present invention pertains to a drive system for a motor vehicle. A drive system of this type generally comprises a drive unit with a drive shaft and a torque-transmitting assembly, which is to be connected on the drive side to the drive shaft of the drive unit for rotation in common around an axis of rotation and connected on the takeoff side to a gearbox.

2. Description of the Related Art

It is known that, in the drive trains of motor vehicles, the drive shaft of a drive unit such as the crankshaft of an internal combustion engine can be connected to a torque-transmitting assembly such as a hydrodynamic torque converter or a friction clutch by the use of a screwed joint. So-called flex plates, for example, can be used for this purpose. The radially inner area of the plate is usually screwed to the drive shaft, whereas the radially outer area of the plate is connected to the torque-transmitting assembly, usually also by means of screws. In this way, the drive shaft and the torque-transmitting assembly are connected to each other for rotation in common, but at the same time the torque-transmitting assembly is also held in position axially with respect to the drive shaft or the drive unit. The disadvantage of this type of screwed joint is that the areas in which the threaded elements used for this purpose are usually provided are comparatively difficult to reach, which increases the amount of assembly work required and often makes it necessary to use expensive special tools.

A drive system in which the connection between a drive shaft and a hydrodynamic torque converter used as a torque-transmitting assembly is accomplished by inserting two plug-in connection arrangements axially into each other is known from U.S. Pat. No. 6,364,777. One of these arrangements is mounted on the drive shaft. The other plug-in connection arrangement is provided on the converter housing. By bringing the converter housing axially up to the plug-in connection arrangement mounted on the drive shaft, the teeth of the two arrangements engage with each other, which makes it possible for torque to be transmitted. To preserve this engagement and thus also to ensure the defined axial positioning of the torque-transmitting assembly with respect to the drive shaft, an axial retaining arrangement acts between the plug-in connection arrangement mounted on the drive shaft and the torque-transmitting assembly. This arrangement comprises a threaded ring, which is screwed onto the radially outer surface of the plug-in connection arrangement mounted on the drive shaft. Radially inward-pointing areas on the ring are then able to grip a projection on the converter housing.

SUMMARY OF THE INVENTION

An object of the present invention is to provide a drive system for a motor vehicle which is of simple design and easy to install but which also ensures that the various assemblies involved in the transmission of torque are reliably connected and positioned with respect to each other.

According to the invention, the torque-transmitting assembly is connected on the drive side to the drive shaft of the drive unit for rotation in common by means of an axial plug-in connection and is connected on the takeoff side to a gearbox, where the torque-transmitting assembly is supported on the gearbox in at least one axial direction.

In the inventive drive system, a clear separation is made between the function of establishing the torque-transmitting connection and the function of axially positioning or axially supporting the torque-transmitting assembly. This means that the axial plug-in connection arrangement does not have to be designed in such a way that it also, simultaneously, ensures the axial positioning or axial support of the torque-transmitting assembly. This allows, for example, the possibility of designing the axial plug-in connection arrangement with a comparatively high degree of elasticity or flexibility, so that it can compensate for or allow axial offsets or wobbling movements. The torque-transmitting assembly is held in a defined position by the position of the gearbox and by the axial support of the torque-transmitting assembly on this gearbox.

For example, the axial plug-in connection arrangement can include a first plug-in connection assembly, which is to be connected nonrotatably to the drive shaft, and a second plug-in connection assembly, which can be brought into engagement for rotation in common with the first plug-in connection assembly by means of an axial plug-in connection and which is connected nonrotatably to the torque-transmitting assembly.

The reliable torque-transmitting functionality of the two plug-in connection assemblies can be achieved by designing one of the assemblies, i.e., the first plug-in connection assembly or the second plug-in connection assembly, with a set of teeth on its inside circumference and the other assembly, i.e., the second plug-in connection assembly or the first plug-in connection assembly, with a set of teeth on its outside circumference. In addition, the first plug-in connection assembly and the second plug-in connection assembly can be supported radially against each other by a radial support arrangement.

For example, the radial support arrangement can comprise an outer circumferential surface on the first plug-in connection assembly, against which the radially inner area of the second plug-in connection assembly is or can be supported.

As previously mentioned, it is a special advantage of the inventive design that at least one of the plug-in connection assemblies can be designed with radial elasticity without leading to the danger of impairment to the defined positioning of, for example, the torque-transmitting assembly.

The torque-transmitting assembly can be supported axially on the gearbox in the direction facing away from the drive shaft and pretensioned in the direction toward this axial support by a pretensioning arrangement. This makes it possible to use relatively simple axial support bearings, which need to absorb only compressive loads.

The pretensioning arrangement can comprise, for example, a spring arrangement acting between the drive shaft and the torque-transmitting assembly.

In an embodiment which is especially advantageous because of the defined positioning and optimization of the axial alignment which it offers, it is proposed that the drive shaft have a central recess, into which an axial projection of the torque-transmitting activity engages, where the pretensioning arrangement is supported on the drive shaft in the area of the recess and acts on the axial projection of the torque-transmitting assembly.

Alternatively, of course, it is also possible for the torque-transmitting assembly to be supported on the gearbox in both axial directions.

For example, a roller bearing which offers support in both directions can be used to support the torque-transmitting assembly on the gearbox.

The torque-transmitting assembly used in the inventive drive system can include a hydrodynamic torque converter, a fluid clutch, either a dry-running or a wet-running friction clutch, a dual-mass flywheel, or the like.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1A shows a modified axial support;

FIG. 3 shows another view corresponding to FIG. 1 of an alternative embodiment.

DETAILED DESCRIPTION OF THE PRESENTLY PREFERRED EMBODIMENTS

Figure 1:
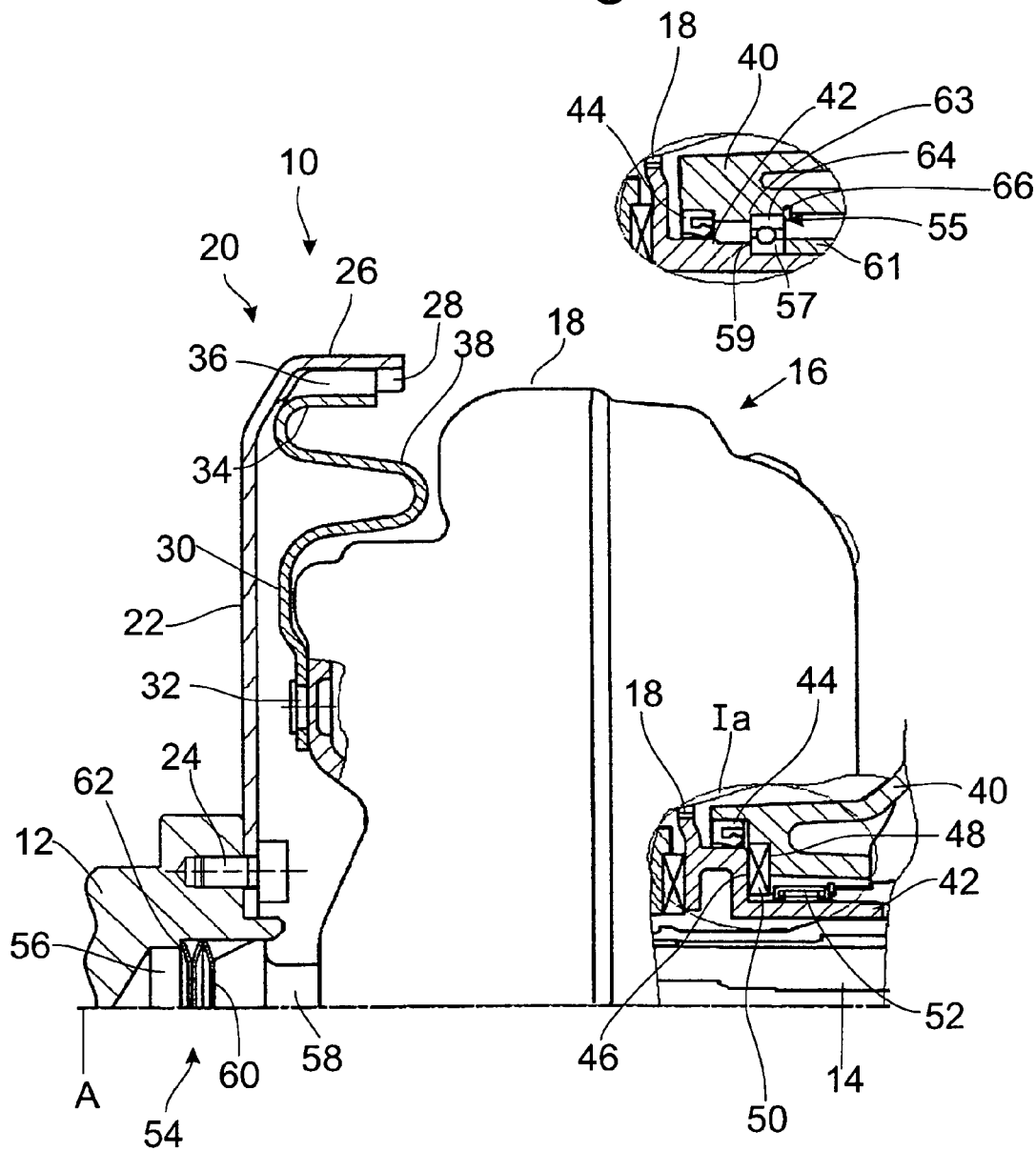
FIG. 1 shows a partial longitudinal cross section through a drive system of inventive design with its essential components.

FIG. 1 shows a schematic diagram of part of a drive system 10 for a motor vehicle. This drive system 10 has as one of its essential components or assemblies a drive shaft 12 of a drive unit (not shown). This drive unit can be an internal combustion engine, in which case the drive shaft 12 can be the crankshaft. On the takeoff side, the drive system 10 has a gearbox input shaft 14 of a gearbox. The torque is transmitted between the drive shaft 12 and the gearbox input shaft 14 by a torque-transmitting assembly 16, which, in the example shown here, is designed as a hydrodynamic torque converter. On the input side, that is, by means of the converter housing 18, this torque-transmitting assembly 16 is or is to be connected for rotation in common around the axis of rotation A to the drive shaft 12 by means of an axial plug-in connection arrangement 20.

The axial plug-in connection arrangement 20 includes a first plug-in connection assembly 22, which is designed essentially in the form of a plate, and which is permanently connected radially on the inside to the drive shaft 12 by a plurality of screw bolts 24. Radially on the outside, the first plug-in connection assembly 22, which is made, for example, by forming a sheet metal blank, is cranked axially to form a more-or-less cylindrical section 26, i.e., a section extending in the axial direction, on which a set of internal teeth 28 is provided.

The axial plug-in connection arrangement 20 also includes a second plug-in connection assembly 30. This second plug-in connection assembly, also formed from a sheet metal blank, for example, is connected radially on the inside to the converter housing 18 and thus to the torque-transmitting assembly 16 by, for example, rivet sections 32 formed as integral parts of the converter housing 18. Radially on the outside, the second plug-in connection assembly 30 has a set of external teeth 36 on a section 34, which extends more-or-less in the axial direction. These external teeth mesh with the set of internal teeth 28 of the first plug-in connection assembly 22. This engagement is produced by the inserting or introducing the two plug-in connection assemblies 22, 30 axially into each other.

Between its radially outer area and its radially inner area, the second plug-in connection assembly 30 has a wavy section 38, so that, as a result of the wavy form extending in the radial direction, both radial and axial elasticity is provided. In this way, it is possible, through radial pretensioning, to keep the two sets of teeth 28, 36 in permanent meshing engagement with each other.

The second plug-in connection assembly 30 does not necessarily have to have the form of a ring-shaped disk in its wavy area 38 or in the radially outer, axially oriented section 34. On the contrary, it could have individual, radially outward-extending arm sections, each of these arm sections carrying one or more of the teeth of the set of teeth 36.

As a result of the two sets of teeth 28, 36, i.e., as a result of the plug-in connection assemblies 22, 30, therefore, a nonrotatable connection is established between the drive shaft 12 and the torque-transmitting assembly 16. So that a defined axial position can also be specified for the torque-transmitting assembly 16 as well, this assembly is, as described below, supported axially against the gearbox or a gearbox housing 40. Reference is made below in this regard to the area shown in cross section on an enlarged scale at the bottom right of FIG. 1.

We can see the gearbox housing 40, in which the radially inner area of the converter housing 18, shown here in cross section and designed as, for example, a pump hub 42, engages. By means of a sealing element 44, a fluid-tight closure is produced between this pump hub 42, i.e., the converter housing 18, on the one side and the gearbox housing 40 on the other. An axial bearing 50 is axially supported on the axial end surface 46 of the pump hub 42, i.e., of the converter housing 18, on the one side and on the axially opposing end surface 48 of the gearbox housing 40 on the other, where, by way of this axial bearing 50, the torque-transmitting assembly 16 is supported axially on the gearbox or on the gearbox housing 40, namely, in the direction facing away from the drive shaft 12. A radial bearing 52 positioned between the gearbox housing 40 and the pump hub 42 ensures a defined radial positioning of the torque-transmitting assembly 16 with respect to the gearbox housing 40 on this axial side of the torque-transmitting assembly.

It should be pointed out here that the two bearings 50, 52 can, of course, be designed either as roller bearings or as plain bearings.

So that the defined positioning of the torque-transmitting assembly 16 in the overall drive system 10 achieved by means of the axial support of one side of the torque-transmitting assembly 16 on the gearbox housing 40 can be kept intact, this assembly is axially preloaded by a preloading arrangement 54 toward this axial support. It can be seen that a depression or recess 56, open in the axial direction, is formed in the drive shaft 12. A centering projection 58 of the torque-transmitting assembly 16 engages axially in this recess. In this way, a defined radial positioning is provided on this axial side of the torque-transmitting assembly 16 for the torque-transmitting assembly 16 with respect to the drive shaft 12 and the axis of rotation A. In the example shown here, the preloading arrangement 54 includes a plurality of axially stacked disk springs 60, which are supported on one side against a bottom area or shoulder 62 of the recess 56 and on the other side against an end surface of the centering projection 58. Through this preloading arrangement 54, therefore, an axially oriented force is generated, which ensures a defined positioning or axial support of the torque-transmitting assembly 16 via the axial bearing 50 on the gearbox or gearbox housing 40.

It can be seen that, in the inventively designed drive system 10, therefore, there is a defined separation of the functionality of the connection for rotation in common from the functionality of the axial positioning or axial retention. This makes it possible, in particular, to design the axial plug-in connection arrangement 20 in a way which is advantageous for fulfilling the torque-transmitting connection function on the one hand while at the same time making it possible to provide enough elasticity to compensate for axial offsets or wobbling movements.

FIG. 1A shows a modification pertaining in particular to the axial support of the torque-transmitting assembly 16. We see here the area where the converter housing 18, i.e., the pump hub 42, is supported on the gearbox housing 40. A roller bearing 55 designed as a ball bearing serves here to provide both radial support and axial support in both axial directions. It can be seen that an inner bearing ring 57 is supported or retained in one axial direction on a radial shoulder 59 of the pump hub 42. A retaining sleeve 61 pushed onto the pump hub 42 holds the bearing ring 57 axially in position with respect to the pump hub 42 in the other axial direction. In a corresponding manner, a radial shoulder 63 is provided on the gearbox housing 40. An outer bearing ring 64 of the bearing 55 is supported in one axial direction against this shoulder. A locking ring 66 provides axial support or retention of the outer bearing ring 64 with respect to the gearbox housing 40 in the other axial direction. In this way, therefore, the pump hub 42 and therefore the entire torque-transmitting assembly 16 is supported and braced in both axial directions against the gearbox housing 40 and thus against the gearbox. The additional axial pretension shown in FIG. 1 is thus not required here.

Figure 2:
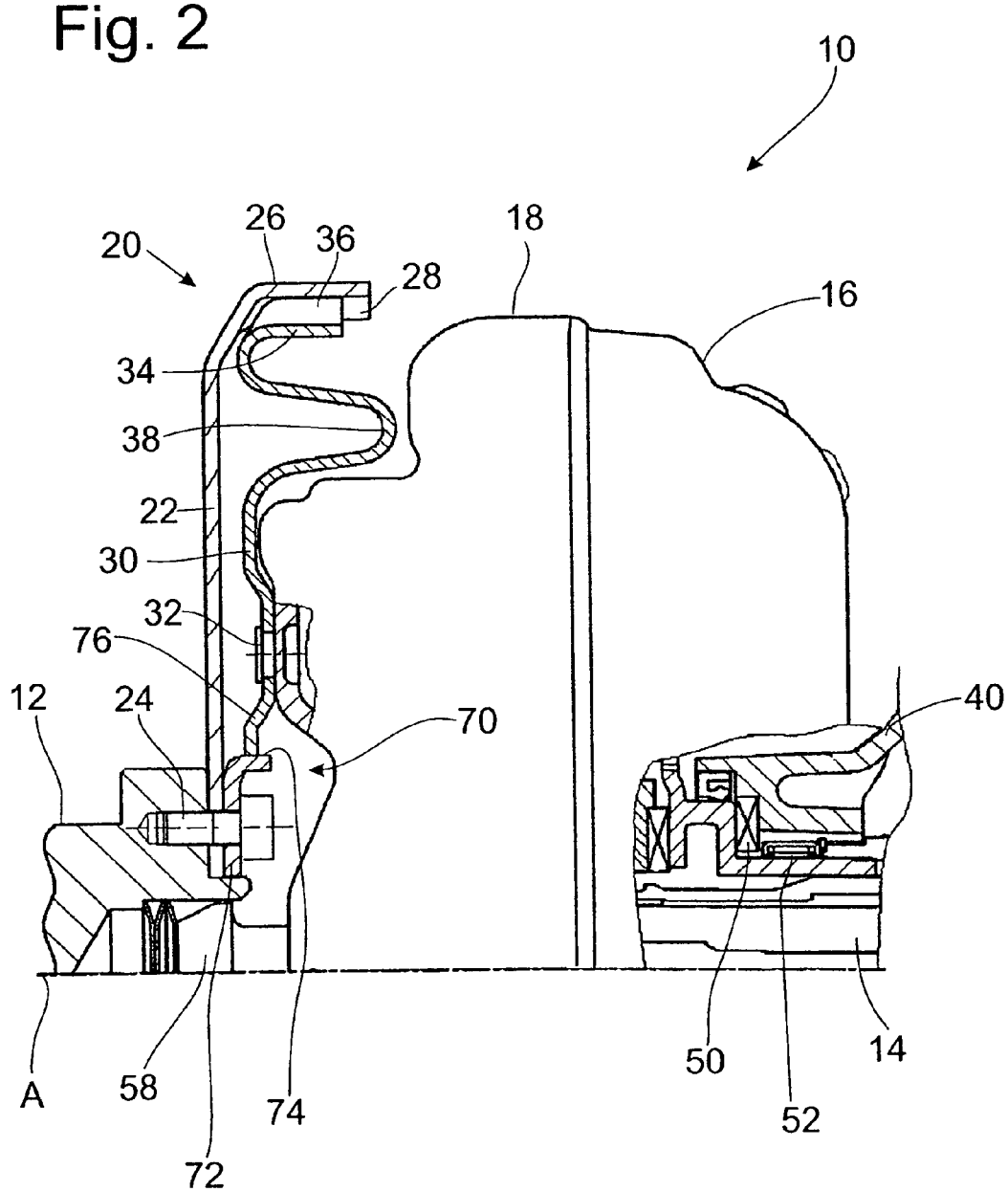
FIG. 2 shows a view, corresponding to FIG. 1, of an alternative embodiment.

An alternative embodiment is shown in FIG. 2. It can be seen in FIG. 2 that the axial plug-in connection arrangement 20 also takes over the function of providing radial support or centering of the converter housing 18, i.e., of the torque-transmitting assembly 16, on the side facing the drive shaft 12. For this purpose, the axial plug-in connection arrangement 20 forms a radial support arrangement 70. This includes a ring-like support element 72, which is attached by screw bolts 24 to the drive shaft 12. The support element 72 provides an outer circumferential surface 74, on which a radially inner end area 76 of the second plug-in connection assembly 30, which extends radially inward beyond the riveted connection to the converter housing 18, is or can be supported radially.

As a result of this additional radial support, it is possible, for example, to omit a corresponding functionality in the area of the projection 58. In particular, this embodiment is advantageous in conjunction with the type of axial support shown in FIG. 1A, because then there is no need at all for the projection 58, by means of which the axial pretension is also provided.

It should be explained here further that the radial support arrangement, i.e., the outer circumferential surface 74 of this arrangement, can also be provided as an integral part of the first plug-in connection assembly, namely, by the formation of parts or tongues bent in the axial direction. Other formations such as axial offsets or steps can also be used to provide this type of outer circumferential surface.

FIG. 3 shows another alternative embodiment. This differs from those described previously primarily in that the second plug-in connection assembly 30 is designed without the wave-like or undulating section 38. Instead, the second plug-in connection assembly 30 extends essentially in a straight line between its radially inner area, in which it is attached by the riveted sections 32 to the converter housing 18, and its radially outer section 34, which extends essentially in the axial direction. So that advantageous radial elasticity can be provided in this case as well, the set of teeth 36 of the second plug-in connection assembly 30 is coated with a layer of elastomeric material such as rubber or the like. In this way, the two plug-in connection assemblies 22, 30 are connected to each other with radial elasticity, so that a stable torque-transmitting engagement is realized through the presence of appropriate pretensioning.

In conclusion, it should also be pointed out again that the design of the torque-transmitting assembly 16 as a hydrodynamic torque converter was used above merely by way of example. It is obvious that the inventive principles can also be applied to torque-transmitting assemblies which are designed or which function in other ways. For example, a fluid clutch, a wet-running friction clutch, a dry-running friction clutch, or a dual-mass flywheel or the like could be installed in a motor vehicle or onto a drive train of a motor vehicle with the use of the same inventive principles described above in order to provide an inventive drive system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive system for a motor vehicle, comprising:
a drive shaft;
a torque-transmitting assembly having a drive side connected to the drive shaft for rotation in common around an axis of rotation by an axial plug-in arrangement, and a take-off side connected to a gearbox; and
means for supporting the torque-transmitting assembly axially on the gearbox,
wherein the torque-transmitting assembly is supported on the gearbox in opposite axial directions.

2. The drive system of claim 1 wherein the axial plug-in arrangement comprises:
a first plug-in connection assembly which is connected non-rotatably to the drive shaft, and
a second plug-in connection assembly which is connected non-rotatably to the torque transmitting assembly, wherein the second plug-in connection assembly can engage the first plug-in connection assembly for rotation in common.

3. The drive system of claim 2 wherein the first and second plug-in connection assemblies are supported radially against each other.

4. The drive system of claim 3 wherein the first plug-in connection assembly has an outer circumferential surface, and the second plug-in connection assembly has a radially inner area which is supported against the outer circumferential surface.

5. The drive system of claim 2 wherein at least one of said plug-in connection assemblies is designed with radial elasticity.

6. The drive system of claim 1, wherein the means for supporting the torque-transmitting assembly axially on the gearbox further comprises a preloading arrangement which loads the torque-transmitting assembly axially toward the gearbox.

7. The drive system of claim 6 wherein the preloading arrangement comprises a compression spring arrangement between the drive shaft and the torque-transmitting assembly.

8. The drive system of claim 7 wherein the drive shaft has a concentric recess which receives the compression spring arrangement, and the torque-transmitting assembly has an axial projection which is received in the recess against the spring arrangement.

9. The drive system of claim 1 wherein the means for supporting the torque-transmitting assembly axially on the gearbox comprises a roller bearing which supports the torque-transmitting arrangement on the gearbox in opposite axial directions.

10. The drive system of claim 1, wherein the torque-transmitting assembly comprises one of a hydrodynamic torque converter, a fluid clutch, a friction clutch, and a dual-mass flywheel.

11. A drive system for a motor vehicle, comprising:
a drive shaft;
a torque-transmitting assembly having a drive side connected to the drive shaft for rotation in common around an axis of rotation by an axial plug-in arrangement, and a take-off side which is to be connected to a gearbox; and
means for supporting the torque-transmitting assembly axially on the gearbox,
wherein the axial plug-in arrangement comprises:
a first plug-in connection assembly which is connected non-rotatably to the drive shaft, and
a second plug-in connection assembly which is connected non-rotatably to the torque transmitting assembly, wherein the second plug-in connection assembly can engage the first plug-in connection assembly for rotation in common, and
wherein one of said plug-in connection assemblies has an inside circumference provided with teeth, and the other of said plug-in connection assemblies has an outside circumference provided with teeth.

12. The drive system of claim 11, wherein the plug-in connection assemblies are arranged between a flexible plate and the torque transmitting assembly.

* * * * *